(12) United States Patent
Leary et al.

(10) Patent No.: US 11,379,511 B1
(45) Date of Patent: Jul. 5, 2022

(54) SYSTEMS, METHODS, AND STORAGE MEDIA FOR PROVIDING A SECURED CONTENT RECOMMENDATION SERVICE BASED ON USER VIEWED CONTENT

(71) Applicant: CBS Interactive Inc., San Francisco, CA (US)

(72) Inventors: Adam Leary, Oakland, CA (US); Rob Harrigan, Murfreesboro, TN (US); Erik Collier, Livermore, CA (US)

(73) Assignee: CBS Interactive, Inc., San Francisco, CA (US)

( * ) Notice: Subject to any disclaimer, the term of this patent is extended or adjusted under 35 U.S.C. 154(b) by 0 days.

(21) Appl. No.: 17/330,559

(22) Filed: May 26, 2021

(51) Int. Cl.
*G06F 16/00* (2019.01)
*G06F 16/43* (2019.01)
*G06F 16/383* (2019.01)

(52) U.S. Cl.
CPC ............ *G06F 16/43* (2019.01); *G06F 16/383* (2019.01)

(58) Field of Classification Search
CPC .................................................. G06F 16/383
See application file for complete search history.

(56) References Cited

U.S. PATENT DOCUMENTS

| 2014/0372216 A1* | 12/2014 | Nath ................. G06Q 30/0256 705/14.54 |
| 2021/0397670 A1* | 12/2021 | Cohen ................. G06F 16/9032 |

* cited by examiner

*Primary Examiner* — Ajith Jacob
(74) *Attorney, Agent, or Firm* — Rimon PC; Marc Kaufman

(57) ABSTRACT

Systems, methods, and storage media for providing a content recommendation service based on user viewed content without access to the user viewed content are disclosed. Exemplary implementations may: make an executable translation component available to a content provider; receive, from the content provider, multiple sets of content information; store the sets of content information in a database; receive a request from the content provider to provide a content recommendation; receive a content ID for content viewed by a user; query the database with a query based on embedding data corresponding to the content ID for content viewed by a user; process the query to obtain additional content IDs which correspond to additional content that is related to the content viewed by the user; and send the additional content IDs to the content provider.

18 Claims, 3 Drawing Sheets

SYSTEMS, METHODS, AND STORAGE MEDIA FOR PROVIDING A SECURED CONTENT RECOMMENDATION SERVICE BASED ON USER VIEWED CONTENT

FIELD OF THE DISCLOSURE

The present disclosure relates to systems, methods, and storage media for providing a secured content recommendation service based on user viewed content without the service provider requiring access to the user viewed content

BACKGROUND

Recommendation engines are type of information filtering system that seeks to predict the "rating" or "preference" a user would give to an item, such as an item of digital content or a physical product. Recommendation engines are used in a variety of areas to enhance online discovery by providing content likely to be of interest to a user based on previous user online activity. For example, recommendation engines have been applied as playlist generators for video and music services, product recommenders for online stores, or content recommenders for social media platforms, restaurants and other web content recommenders. Recommendation engines accept inputs, such as music, videos web search queries or other web content which has been generated and/or consumed by a user and generate and output indicative of additional content that is likely to be of interest to the user as an output.

Recently, recommendation engines have been offered as a third party service. For example, a content provider, as a customer of the service provider, can use a recommendation service to provide recommendations to users of the content provider's content based on the user's activity on a web site, set top box, or the like, of the content provider. The service provider (referred to as "vendor" herein) receives content consumed by the user on the content provider platform as inputs and returns an indication of recommended content in a manner that appears, to the user, to be integrated into the content provider platform. However, this process requires that the service provider receive at least a part of the content consumed by the user in order to ascertain related content. Therefore, conventional recommendation engine services are not secure and often expose sensitive or proprietary content. It is known to attempt to use legal obligations and DRM technologies to limit use of the content by the recommendation service provider vendor. However, such approaches are complex and do not prevent the vendor from using the content for testing, creating recommendation models, and the like. Further, while legal obligations and DRM technology provide obstacles to use of the content by the vendor, they cannot prevent, with certainty unauthorized use of the content by the vendor.

SUMMARY

Disclosed implementations provide a distributed network computing system in which the recommendation vendor receives and processes only secure data embeddings. The absolute position of these embeddings are not mathematically relevant to the distances used for generating recommendations. This allows the vendor to provide a recommendation engine as a third party service without a need to receive the user consumed content.

One aspect of the present disclosure relates to a system configured for providing a content recommendation service based on user viewed content without access to the user viewed content. The system may include one or more hardware processors configured by machine-readable instructions. The processor(s) may be configured to make an executable translation component available to a content provider. The translation component may include a component for translating source text to embedding vectors and obfuscating the embedding vectors to create embedding data corresponding to the source text. The embedding data may be indicative of the subject matter of the source text. The processor(s) may be configured to receive, from the content provider, multiple sets of content information. Each set of content information may include embedding data and a content ID corresponding content. The embedding data may be created by processing content to create source text and processing the source text by the executable translation component to create the embedding data. The processor(s) may be configured to store the sets of content information in a database. The processor(s) may be configured to receive a request from the content provider to provide a content recommendation. The processor(s) may be configured to receive a content ID for content viewed by a user. The content may be viewed by the user through a service provided by the content provider. The processor(s) may be configured to query the database with a query based on embedding data corresponding to the content ID for content viewed by a user. The processor(s) may be configured to process the query to obtain additional content IDs which correspond to additional content that is related to the content viewed by the user. The processor(s) may be configured to send the additional content IDs to the content provider. The content provider can ascertain the additional content and present the related content to the user.

Another aspect of the present disclosure relates to a method for providing a content recommendation service based on user viewed content without access to the user viewed content. The method may include making an executable translation component available to a content provider. The translation component may include a component for translating source text to embedding vectors and obfuscating the embedding vectors to create embedding data corresponding to the source text. The embedding data may be indicative of the subject matter of the source text. The method may include receiving, from the content provider, multiple sets of content information. Each set of content information may include embedding data and a content ID corresponding content. The embedding data may be created by processing content to create source text and processing the source text by the executable translation component to create the embedding data. The method may include storing the sets of content information in a database. The method may include receiving a request from the content provider to provide a content recommendation. The method may include receiving a content ID for content viewed by a user. The content may be viewed by the user through a service provided by the content provider. The method may include querying the database with a query based on embedding data corresponding to the content ID for content viewed by a user. The method may include processing the query to obtain additional content IDs which correspond to additional content that is related to the content viewed by the user. The method may include sending the additional content IDs to the content provider. The content provider can ascertain the additional content and present the related content to the user.

Yet another aspect of the present disclosure relates to a non-transient computer-readable storage medium having instructions embodied thereon, the instructions being executable by one or more processors to perform a method for providing a content recommendation service based on user viewed content without access to the user viewed content. The method may include making an executable translation component available to a content provider. The translation component may include a component for translating source text to embedding vectors and obfuscating the embedding vectors to create embedding data corresponding to the source text. The embedding data may be indicative of the subject matter of the source text. The method may include receiving, from the content provider, multiple sets of content information. Each set of content information may include embedding data and a content ID corresponding content. The may embedding data may be created by processing content to create source text and processing the source text by the executable translation component to create the embedding data. The method may include storing the sets of content information in a database. The method may include receiving a request from the content provider to provide a content recommendation. The method may include receiving a content ID for content viewed by a user. The content may be viewed by the user through a service provided by the content provider. The method may include querying the database with a query based on embedding data corresponding to the content ID for content viewed by a user. The method may include processing the query to obtain additional content IDs which correspond to additional content that is related to the content viewed by the user. The method may include sending the additional content IDs to the content provider. The content provider can ascertain the additional content and present the related content to the user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Vendors offering recommendations often ask for customers to provide all of the customer's content that will be included in the locus of potential recommendations in the customer's Content Management System (CMS) as well as information indicating user interaction with the content. The disclosed implementations include a content recommender with increased privacy because the vendor can compute recommendations without any access to the customer's content.

At a high level, the disclosed implementations extract a text document from content and calculate a distance between this text in a mathematical representation, known as an "embedding." The term "embedding" is commonly known in the computational linguistic domain as the mapping of words into numerical vector spaces. Documents which have embeddings which are close, are similar semantically.

Figure 1:
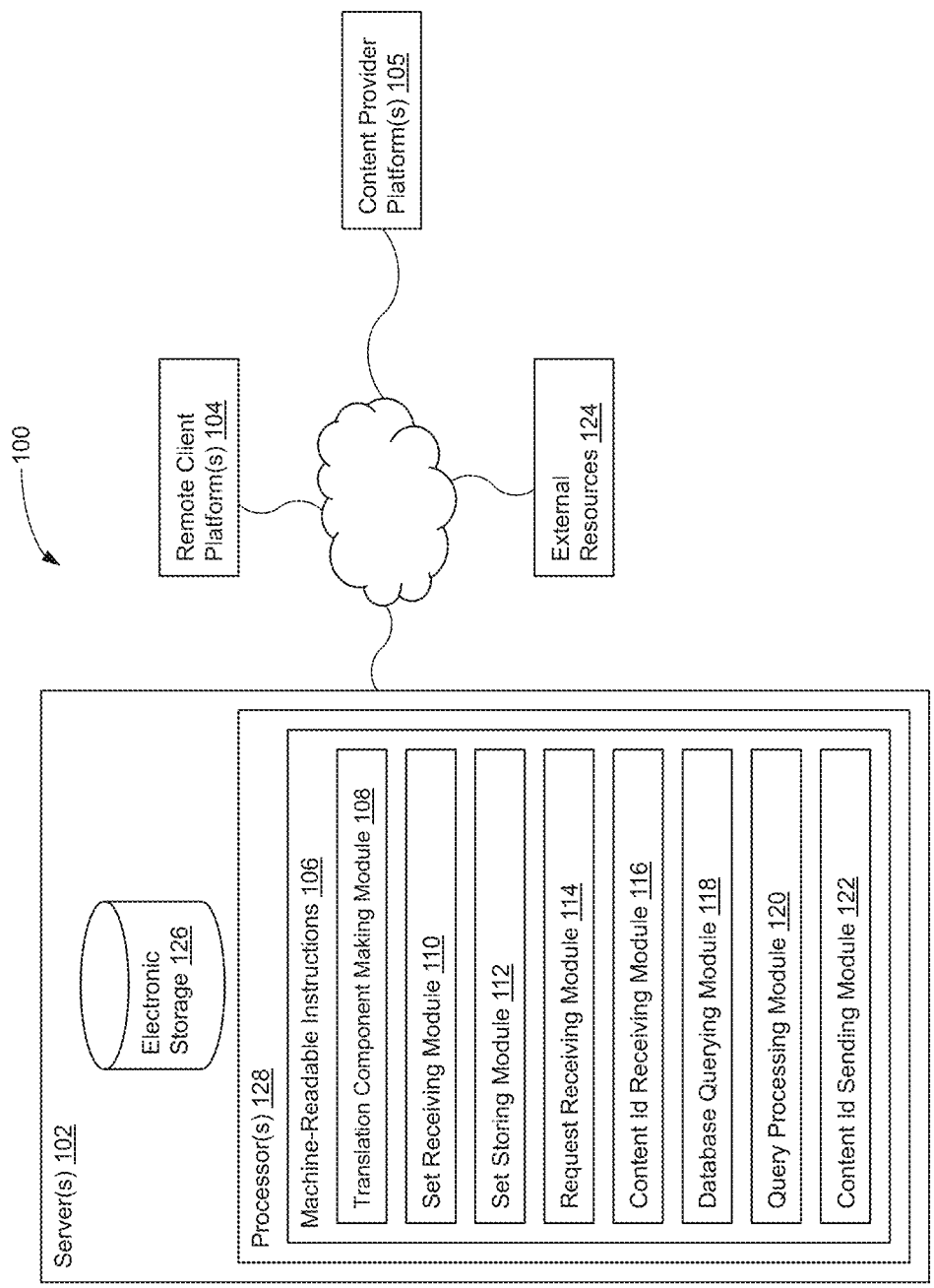
FIG. 1 illustrates a system configured for providing a content recommendation service based on user viewed content without access to the user viewed content, in accordance with one or more implementations.

FIG. 1 illustrates system 100 configured for providing a content recommendation service based on user viewed content without access to the user viewed content, in accordance with one or more implementations. In some implementations, system 100 may include one or more servers 102. Server(s) 102 may be configured to communicate with one or more remote client computing platforms 104 and content provider platform(s) 105 according to a client/server architecture and/or other architectures. Client computing platform(s) 104 and content provider platform(s) 105 may be configured to communicate with each other client according to a peer-to-peer architecture and/or other architectures. Users, such as consumers of content provided by content provider platform(s) 105 may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of translation component module 108, embedding receiving module 110, embedding storing module 112, request receiving module 114, content ID receiving module 116, database querying module 118, query processing module 120, content ID sending module 122, and/or other instruction modules.

Translation component making module 108 may be configured to make an executable translation component available to content provider. The translation component may include a component for translating source text to embedding vectors and obfuscating the embedding vectors to create embedding data corresponding to the source text. The embedding data may be indicative of the subject matter of the source text.

Embedding receiving module 110 may be configured to receive, from the content provider, multiple sets of content information. Each set of content information may include embedding data and a content ID corresponding content. The embedding data can be created by the content provider processing content to create source text and processing the source text by the executable translation component to create the embedding data.

embedding storing module 112 may be configured to store the sets of content information in a database. Request receiving module 114 may be configured to receive a request from content provider platform(s) 105 to provide a content recommendation.

Content ID receiving module 116 may be configured to receive a content ID for content viewed by a user. The content may be viewed by the user through a content service provided by the content provider. The content service provided by the content provider may be a web site executed on one or more web server devices. Receiving a content ID may include receiving a content ID from the user device.

The translation component may be provided to the content provider by the server(s) 102 associated with the vendor. The translation component may expose an application programming interface for transmitting embedding content to the one or more servers 102 and transmitting requests for content recommendations to the one or more servers 102.

Database querying module 118 may be configured to query the database with a query based on embedding data corresponding to the content ID for content consumed by a user. The content may be consumed by the user through a web browser, or other rendering engine, on a user device, such as client platform 104, that is remote from the one or more web server devices.

Query processing module 120 may be configured to process the query to obtain additional content IDs which correspond to additional content that is related to the content consumed by the user. Content ID sending module 122 may be configured to send the additional content IDs (IDs of related content) to the content provider. The content provider can ascertain the additional content and present the related content to the user.

In some implementations, server(s) 102, client computing platform(s) 104, content provider platform(s) 105 and/or additional external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 or content provider platform 105 may include one or more processors configured to execute computer program modules. The computer program modules may be configured to enable an expert or user associated with the given client computing platform 104 to interface with system 100, content provider platform 105 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122, and/or other modules. Processor(s) 128 may be configured to execute modules 108, 110, 112, 114, 116, 118, 120, and/or 122, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2:
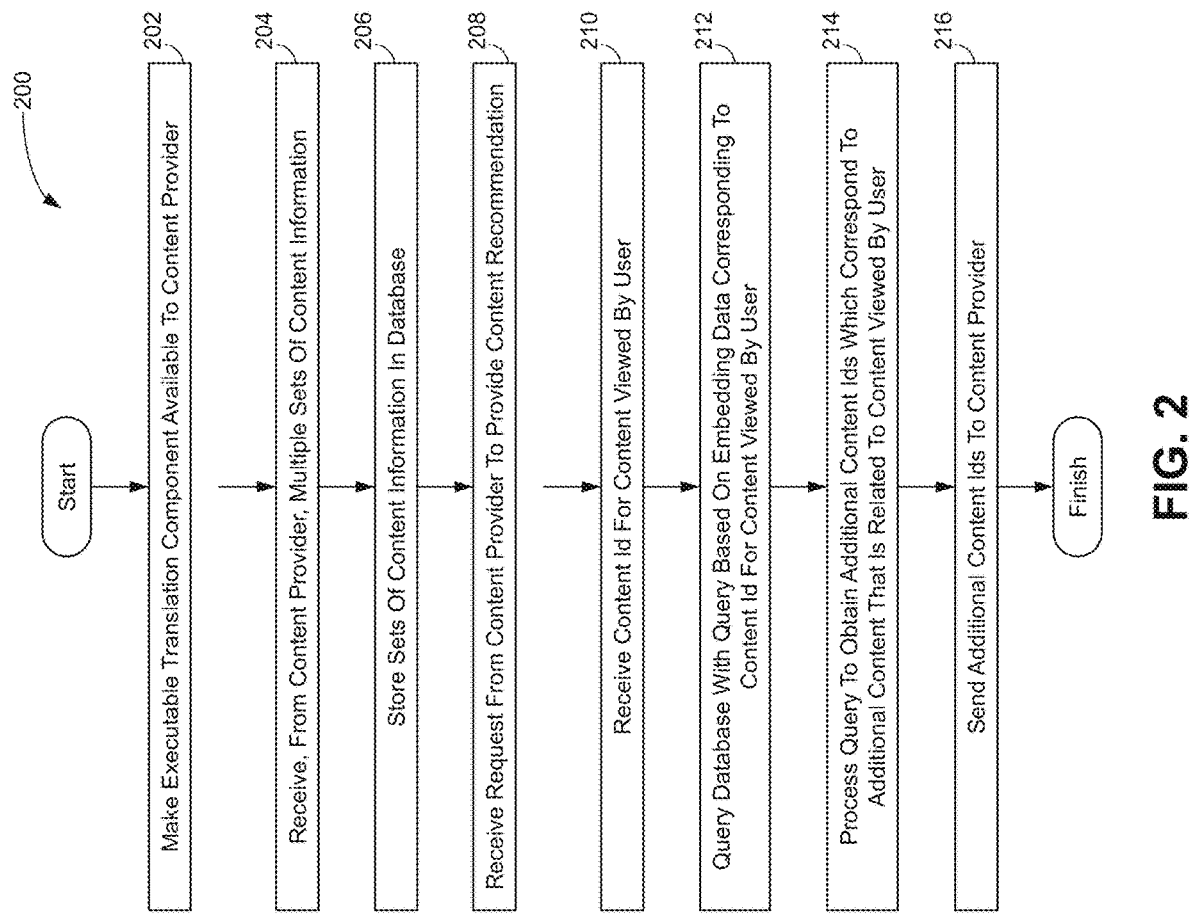
FIG. 2 illustrates a method for providing a content recommendation service based on user viewed content without access to the user viewed content, in accordance with one or more implementations.

FIG. 2 illustrates a method 200 for providing a content recommendation service based on user viewed content without access to the user viewed content, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. For example, method 200 can be implanted by system 100 described above with reference to FIG. 1.

An operation 202 may include making an executable translation component available to a content provider. The translation component may include a component for translating source text to embedding vectors and obfuscating the embedding vectors to create embedding data corresponding to the source text. The embedding data may be indicative of the subject matter of the source text. Operation 202 may be performed by one or more hardware processors configured by machine-readable instructions including a module that is the same as or similar to translation component making module 108, in accordance with one or more implementations.

An operation 204 may include receiving, from the content provider, multiple sets of content information. Each set of content information may include embedding data and a content ID corresponding content. The embedding data can be created by the content provider processing content to create source text and processing the source text by the executable translation component to create the embedding data. Operation 204 may be performed by one or more hardware processors configured by machine-readable instructions including a module that is the same as or similar to set receiving module 110, in accordance with one or more implementations.

An operation 206 may include storing the sets of content information in a database. Operation 206 may be performed by one or more hardware processors configured by machine-readable instructions including a module that is the same as or similar to set storing module 112, in accordance with one or more implementations.

An operation 208 may include receiving a request from the content provider to provide a content recommendation. Operation 208 may be performed by one or more hardware processors configured by machine-readable instructions including a module that is the same as or similar to request receiving module 114, in accordance with one or more implementations.

An operation 210 may include receiving a content ID for content viewed by a user. The content may be viewed by the user through a service provided by the content provider. Operation 210 may be performed by one or more hardware processors configured by machine-readable instructions including a module that is the same as or similar to content ID receiving module 116, in accordance with one or more implementations.

An operation 212 may include querying the database with a query based on embedding data corresponding to the content ID for content viewed by a user. Operation 212 may be performed by one or more hardware processors configured by machine-readable instructions including a module that is the same as or similar to database querying module 118, in accordance with one or more implementations.

An operation 214 may include processing the query to obtain additional content IDs which correspond to additional content that is related to the content viewed by the user. Operation 214 may be performed by one or more hardware processors configured by machine-readable instructions including a module that is the same as or similar to query processing module 120, in accordance with one or more implementations.

An operation 216 may include sending the additional content IDs to the content provider. The content provider can ascertain the additional content and present related content to the user. Operation 216 may be performed by one or more hardware processors configured by machine-readable instructions including a module that is the same as or similar to content ID sending module 122, in accordance with one or more implementations.

Figure 3:
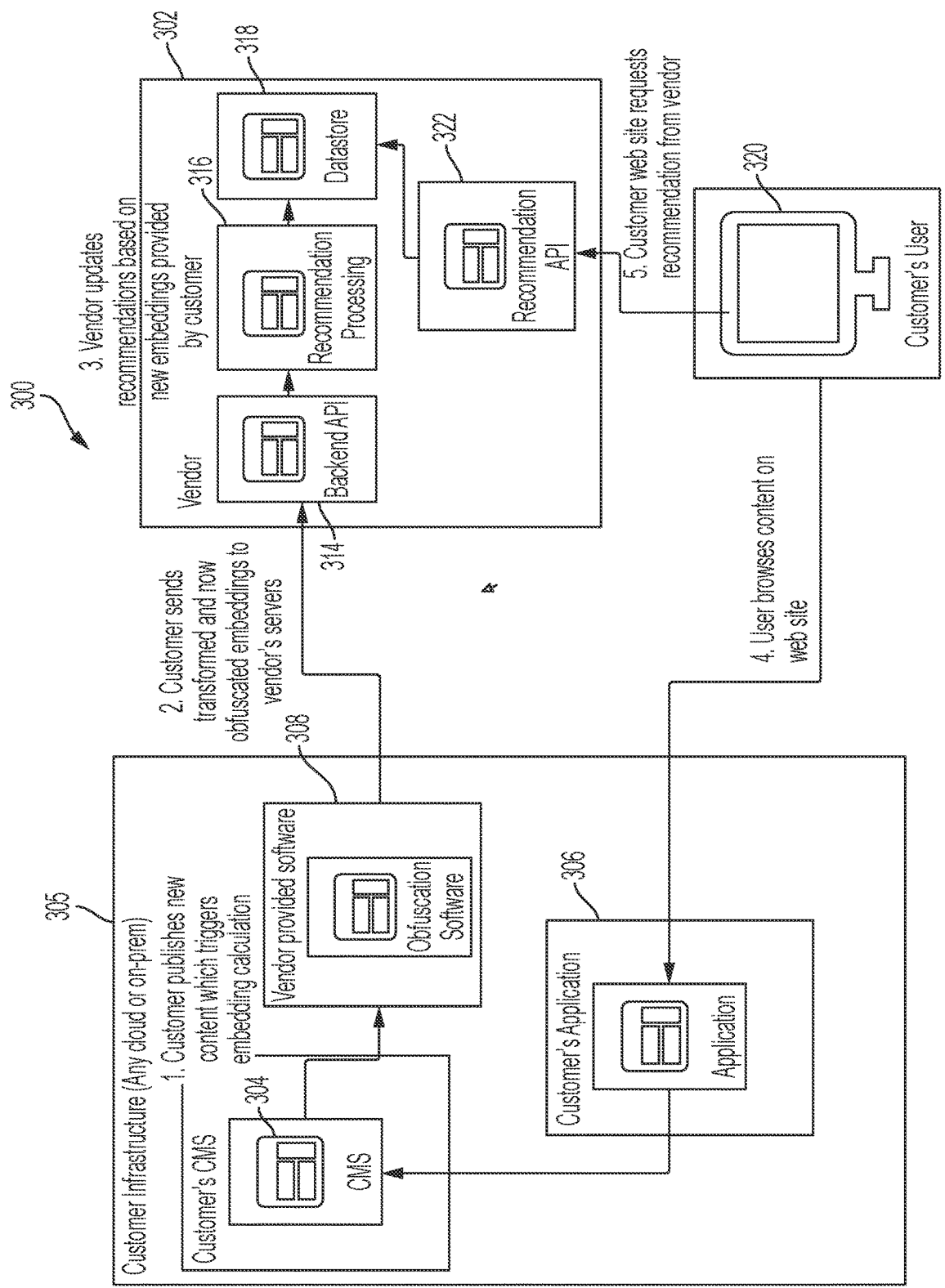
FIG. 3 illustrates a computer architecture and process flow in accordance with one or more implementations.

FIG. 3 illustrates an example computer architecture 300 and data flow sequence in accordance with the disclosed implementation. In the disclosed implementations, vendor 302 (through server 102 of FIG. 1 for example) receives and processes embeddings. Customer 305 (for example content provider 105 of FIG. 1), the content provider who has engaged vendor 302, can run application 308, provided by the vendor as a "docker container" for example to translate the text of documents into the embeddings. Docker is a known set of platform as a service (PaaS) products that leverage virtualization to deliver software in packages called "containers." Containers bundle their own software, libraries, and configuration files and communicate with one another through defined channels.

The container can expose various endpoints such as:
POST/content/<content_id>—To add or update a piece of content
  This endpoint takes a payload (JSON for example) describing a piece of content, extracts the text, converts that text to embedding vectors, translates and rotates those embedding vectors and sends those vectors back to the vendor for storage and analysis.
DELETE/content/<content_id>—To remove a piece of content
GET/content/<content_id>/recommendations—To fetch recommendations for a given piece of content.
GET/content/<content_id>—To get ID information about a piece of content At step 1, customer 302 causes an embedding calculation to be accomplished for one or more items of content. The embedding calculation can be triggered by publication of the content and is accomplished by application 308 provided by vendor 302. Further, customer 305 can control a password which is used to encrypt random translation and rotation parameters to obfuscate the embeddings. Vendor 302 in this example has no knowledge of these parameters and thus cannot ascertain the actual text. At step 2, the embeddings get sent, through API 314 to a recommendation engine 316 of vendor 302. Significantly, the text of the content is not received or stored by vendor 302. At 3, vendor 302 updates recommendation engine 318 based on the received embeddings and the embeddings are stored in database 318 of vendor in association with a content ID that can be provided by customer 305.

At step 4, user 320 consumes content from CMS 304 of customer 305. For example, the consumption can be the browsing of a web page or otherwise viewing content. At step 5, the web site of customer 305 requests a recommendation service through API 322. The request includes a content ID for the content being consumed by user 320. In response to the request, vendor 302 looks up other content that has similar embeddings to the content corresponding to the content ID in the request. Vendor 302 can then send content IDs of similar/recommended content to customer 305, which can provide the similar/recommended content to the user. Note that vendor 302 can utilize a "Kubernetes cluster." Kubernetes is an open-source container-orchestration system for automating computer application deployment.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing a content recommendation service based on user viewed content without access to the user viewed content, the system comprising:
   one or more hardware processors configured by machine-readable instructions to:
      make an executable translation component available to a content provider, the translation component including a component for translating source text to embedding vectors and obfuscating the embedding vectors to create embedding data corresponding to the source text, wherein the embedding data is indicative of the subject matter of the source text;
      receive, from the content provider, multiple sets of content information, each set of content information including embedding data and a content ID corresponding content, the embedding data being created by processing content to create source text and processing the source text by the executable translation component to create the embedding data;
      store the sets of content information in a database;
      receive a request from the content provider to provide a content recommendation;
      receive a content ID for content viewed by a user, the content being viewed by the user through a service provided by the content provider;
      query the database with a query based on embedding data corresponding to the content ID for content viewed by a user;
      process the query to obtain additional content IDs which correspond to additional content that is related to the content viewed by the user; and
      send the additional content IDs to the content provider, wherein the content provider can ascertain the additional content and present the related content to the user.

2. The system of claim 1, wherein the service provided by the content provider is a web site executed on one or more web server devices, the web site being viewed by the user through a web browser on a user device that is remote from the one or more web server devices.

3. The system of claim 2, wherein the method is executed by one or more vendor severs that are remote from the one or more web servers.

4. The system of claim 2, wherein receiving a content ID comprises receiving a content ID from the user device.

5. The system of claim 3, wherein the translation component is provided to the content provider by the vendor servers.

6. The system of claim 3, wherein the translation component exposes an application programming interface for transmitting embedding content to the one or more vendor servers and transmitting requests for content recommendations to the one or more vendor servers.

7. A method for providing a content recommendation service based on user viewed content without access to the user viewed content, the method comprising:
   making an executable translation component available to a content provider, the translation component including a component for translating source text to embedding vectors and obfuscating the embedding vectors to create embedding data corresponding to the source text, wherein the embedding data is indicative of the subject matter of the source text;
   receiving, from the content provider, multiple sets of content information, each set of content information including embedding data and a content ID corresponding content, the embedding data being created by processing content to create source text and processing the source text by the executable translation component to create the embedding data;
   storing the sets of content information in a database;
   receiving a request from the content provider to provide a content recommendation;
   receiving a content ID for content viewed by a user, the content being viewed by the user through a service provided by the content provider;
   querying the database with a query based on embedding data corresponding to the content ID for content viewed by a user;
   processing the query to obtain additional content IDs which correspond to additional content that is related to the content viewed by the user;
   sending the additional content IDs to the content provider, wherein the content provider can ascertain the additional content and present the related content to the user.

8. The method of claim 7, wherein the service provided by the content provider is a web site executed on one or more web server devices, the web site being viewed by the user through a web browser on a user device that is remote from the one or more web server devices.

9. The method of claim 8, wherein the method is executed by one or more vendor severs that are remote from the one or more web servers.

10. The method of claim 8, wherein receiving a content ID comprises receiving a content ID from the user device.

11. The method of claim 9, wherein the translation component is provided to the content provider by the vendor servers.

12. The method of claim 9, wherein the translation component exposes an application programming interface for transmitting embedding content to the one or more vendor servers and transmitting requests for content recommendations to the one or more vendor servers.

13. A non-transient computer-readable storage medium having instructions embodied thereon, the instructions being executable by one or more processors to perform a method for providing a content recommendation service based on user viewed content without access to the user viewed content, the method comprising:

making an executable translation component available to a content provider, the translation component including a component for translating source text to embedding vectors and obfuscating the embedding vectors to create embedding data corresponding to the source text, wherein the embedding data is indicative of the subject matter of the source text;

receiving, from the content provider, multiple sets of content information, each set of content information including embedding data and a content ID corresponding content, the embedding data being created by processing content to create source text and processing the source text by the executable translation component to create the embedding data;

storing the sets of content information in a database;

receiving a request from the content provider to provide a content recommendation;

receiving a content ID for content viewed by a user, the content being viewed by the user through a service provided by the content provider;

querying the database with a query based on embedding data corresponding to the content ID for content viewed by a user;

processing the query to obtain additional content IDs which correspond to additional content that is related to the content viewed by the user;

sending the additional content IDs to the content provider, wherein the content provider can ascertain the additional content and present the related content to the user.

14. The computer-readable storage medium of claim 13, wherein the service provided by the content provider is a web site executed on one or more web server devices, the web site being viewed by the user through a web browser on a user device that is remote from the one or more web server devices.

15. The computer-readable storage medium of claim 14, wherein the method is executed by one or more vendor severs that are remote from the one or more web servers.

16. The computer-readable storage medium of claim 14, wherein receiving a content ID comprises receiving a content ID from the user device.

17. The computer-readable storage medium of claim 15, wherein the translation component is provided to the content provider by the vendor servers.

18. The computer-readable storage medium of claim 15, wherein the translation component exposes an application programming interface for transmitting embedding content to the one or more vendor servers and transmitting requests for content recommendations to the one or more vendor servers.

\* \* \* \* \*